United States Patent [19]
Taguri et al.

[11] Patent Number: 5,209,265
[45] Date of Patent: May 11, 1993

[54] FLOW CONTROL DEVICE WITH RESTRICTOR

[75] Inventors: Noboru Taguri, Osaka; Yasuo Maeda, Nara; Shinjiro Seto, Shijonawate; Yoshihiro Sakurai, Ibaraki, all of Japan

[73] Assignee: Matsushita Electric Works, Ltd., Osaka, Japan

[21] Appl. No.: 821,661

[22] Filed: Jan. 16, 1992

Related U.S. Application Data
[62] Division of Ser. No. 685,120, Apr. 15, 1991.

[30] Foreign Application Priority Data
- Apr. 14, 1990 [JP] Japan .................................. 2-39706
- Aug. 1, 1990 [JP] Japan .................................. 2-82259

[51] Int. Cl.$^5$ .................................................. F16K 15/14
[52] U.S. Cl. .................................... 138/45; 138/40; 138/42; 138/44; 138/46
[58] Field of Search .................... 138/40, 42, 43, 44, 138/45, 46, 41; 239/533.1, 533.13, 533.14; 137/107

[56] References Cited

U.S. PATENT DOCUMENTS

| | | | |
|---|---|---|---|
| 2,829,674 | 4/1958 | Segelhorst et al. | 138/45 |
| 3,431,944 | 3/1969 | Sakuma | 138/45 |
| 3,826,463 | 7/1974 | Beauregard | 138/45 |
| 3,837,362 | 9/1974 | Barnes | 138/45 |
| 4,650,094 | 3/1987 | Werding | 138/45 |
| 4,867,198 | 9/1989 | Faust | 137/503 |
| 4,883,093 | 11/1989 | Miles et al. | 138/45 |
| 5,082,240 | 1/1992 | Richmond | 138/45 |

Primary Examiner—James E. Bryant, III
Attorney, Agent, or Firm—Nikaido, Marmelstein, Murray & Oram

[57] ABSTRACT

A flow control device for feeding water flow at a constant flow volume regardless of the pressure. The device comprises a conduit body with a coupling end for coupling with a water supply pipe to receive water therefrom and a discharge end for discharging the water therethrough. The conduit body is formed in the coupling end with a concavity having a bottom wall recessed from the coupling end face and a peripheral inner wall. A passage extends through the conduit body to have its one end opened into the bottom wall and the other end leading to a discharge end. Received within the concavity is an elastic valve having a constricted aperture in fluid communication between the water supply pipe and the passage for feeding the water into the passage through the aperture from the water supply pipe. The elastic valve is capable of elastically deforming to vary a diameter of the aperture in proportion to the pressure of the water applied thereto in order to feed the water through the passage at a constant flow volume regardless of the supplied water pressure. The valve is formed on its outer periphery with three or more projections spaced circumferentially about the aperture to be in pressed contact relation with the peripheral inner wall of the concavity for holding the valve in position within the concavity.

3 Claims, 4 Drawing Sheets

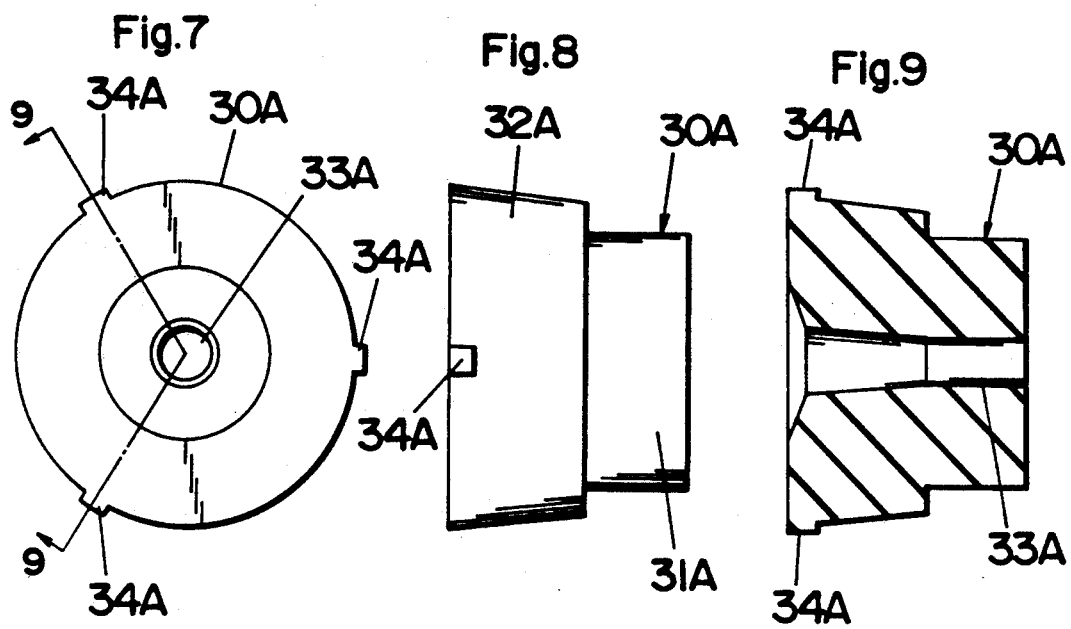
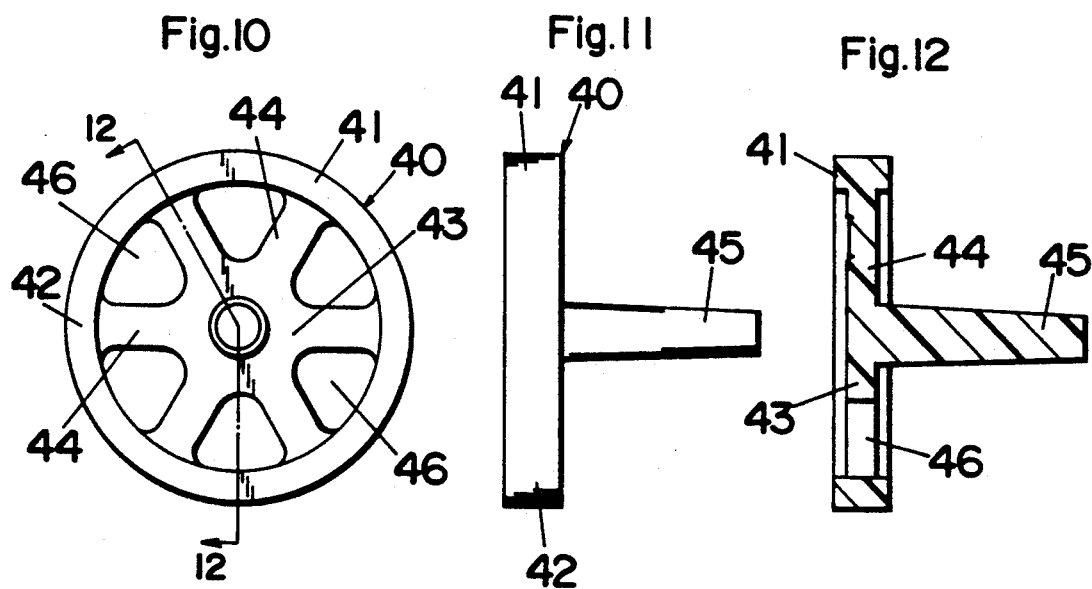

FLOW CONTROL DEVICE WITH RESTRICTOR

This is a division, of application Ser. No. 07/685,120 filed Apr. 15, 1991.

BACKGROUND OF THE INVENTION

1. Field of the Invention

The present invention is directed to a flow control device, and more particularly to a flow control device adapted to be incorporated into a toilet or bidet to feed a constant flow of water for washing the posterior parts or the genitals.

2. Description of the Prior Art

In recent years there have been a growing demand to give to toilets or bidets an additional capability of feeding a rush of water for washing the posterior parts or the genitals. For this purpose, the toilets or bidets are required to include a flow control device for feeding the rush of water at a constant flow volume irrespective of the pressure of the incoming water from a water supply pipe. The prior flow control device is generally designed to have a conduit body having an coupling end for coupling with the water supply pipe, a discharge end connected to a spout for ejecting the rush of water, and a passage extending from the coupling end to the discharge end. A concavity is formed in the coupling end of the conduit body to receive therein an elastic valve with an aperture in fluid communication between the water supply pipe and the passage. The elastic valve is capable of deforming under pressure to vary a valve opening or diameter of the aperture to thereby maintain the volume of the water flown through the aperture to the passage at a constant level irrespective of pressure variation in the water supplied from the water supply pipe. For positioning of the valve within the concavity, the prior art device necessitates an additional fitting with an O-ring seated therearound, which fitting is secured in position over the valve by pressing the O-ring against the peripheral inner wall of the concavity to hold the valve between the fitting and the bottom of the concavity. Since the fitting is pressed against the peripheral inner wall of the concavity over its entire periphery by means of the O-ring, it can be firmly held in position. However, such firm gripping of the fitting poses a problem that it detract convenience of replacing the valve which is required frequently, in addition to that the fitting itself increases the number of parts in the device.

SUMMARY OF THE INVENTION

The above problem has been successfully eliminated in a flow control device of the present invention. The flow control device comprises a conduit body with a coupling end for coupling with a water supply pipe to receive water therefrom and a discharge end for discharging the water therethrough. The conduit body is formed in the coupling end with a concavity having a bottom wall recessed from the coupling end face and a peripheral inner wall. A passage extends through the conduit body to have its one end opened into the bottom wall and the other end leading to a discharge end. Received within the concavity is an elastic valve having an aperture in fluid communication between the water supply pipe and the passage for feeding the water into the passage through the aperture from the water supply pipe. The elastic valve is capable of elastically deforming to vary a diameter of the aperture in proportion to the pressure of the water applied thereto in order to feed the water through the passage at a constant flow volume regardless of the supplied water pressure. The valve is formed on its outer periphery with three or more projections spaced circumferentially about the aperture to be in pressed contact relation with the peripheral inner wall of the concavity for holding the valve in position within the concavity. Therefore, the valve itself can be held in position without requiring any further fitting. In addition, due to such pressed contact at circumferentially spaced portions around the valve, the valve can be readily detached from the conduit body for easy replacement thereof.

Accordingly, it is a primary object of the present invention to provide a flow control device which is capable of easily replacing the elastic valve, yet holding the valve in position without requiring any fitting therefor.

In a preferred embodiment, the valve is integrally formed on its end face opposed to the bottom wall with a stud for abutment against the bottom wall at a portion radially outwardly of the passage. With this provision of the stud, the end face of the valve can be spaced the bottom wall to reduce the frictional engagement between the valve and the bottom wall. With this result, the valve can deform under pressure relatively freely from the engagement with the bottom wall to improve the capability of varying the diameter of the aperture in an exact compliance with the pressure variation, which is therefore another object of the present invention.

In another preferred embodiment, the flow control device additionally includes a restrictor with a rectifier plate and a flow regulating needle projecting from the center of the rectifier plate. The rectifier plate is disposed between the valve and the bottom wall of the concavity with the flow regulating needle projecting loosely into said aperture in such a manner as to define a constricted annular channel within the aperture about the flow regulating needle. An vent is formed in the rectifier plate for fluid communication between the annular channel and the passage in the conduit body. With the provision of the flow regulating needle, it is possible to obtain a small cross section of flow, i.e., the annular channel even with the aperture of relatively large diameter. Thus, the valve is allowed to have the aperture of relatively large diameter and therefore can be readily molded with improved accuracy of the aperture. In fact, when molding the valve to have the aperture of a small diameter, a mold die requires a correspondingly small insert pin which is rather difficult to be made accurately, thereby failing to obtain a desired small aperture with accurate dimension. Further, as the aperture becomes smaller it reduce a diameter ratio of the aperture to the valve, which makes it difficult to vary the diameter of the aperture over a wide range against the pressure variation in the supplied water, failing to obtain a constant water flow from the supplied water of varying pressures. These insufficiencies can be eliminated in the above arrangement in which the valve is formed to have a relatively large aperture but defines the constricted annular channel in cooperation with the flow regulating needle inserted in the aperture. In other words, thus formed annular channel can be constricted into a small cross section so as to be capable of greatly reducing the flow rate for obtaining a constant water flow even with a high pressure of the water being supplied, in addition to that the annular channel is capable of varying its cross section successfully in proportion to the pressure applied to the valve for maintaining the flow volume at a constant level over a wide range of pressure variation in the water being supplied. Further, due to the provision of the rectifier plate between the valve and the passage of the conduit body, the water rushing through the constricted annular channel can be baffled and rectified at the rectifier plate so as to prevent occurrence of undesirable cavitation which might otherwise occur when the water is considerably restricted in the valve.

It is therefore a further object of the present invention to provide a flow control device which is capable of regulating the water flow over a wide range of pressure variation in the water being supplied and eliminating undesirable cavitation.

These and still other objects and advantages will become more apparent from the following description of the preferred embodiments when taken in conjunction with the attached drawings.

BRIEF DESCRIPTION OF THE DRAWINGS

FIG. 7 is a front end view of an elastic valve constituting the above flow control device;

FIG. 8 is a side view of the elastic valve;

FIG. 9 is a sectional view taken along line 9—9 of FIG. 7;

FIG. 10 is a front end view of a restrictor employed in the above flow control device;

FIG. 11 is a side view of the restrictor; and

FIG. 12 is a sectional view taken along line 12—12 of FIG. 10.

DESCRIPTION OF THE PREFERRED EMBODIMENTS

Figure 1:
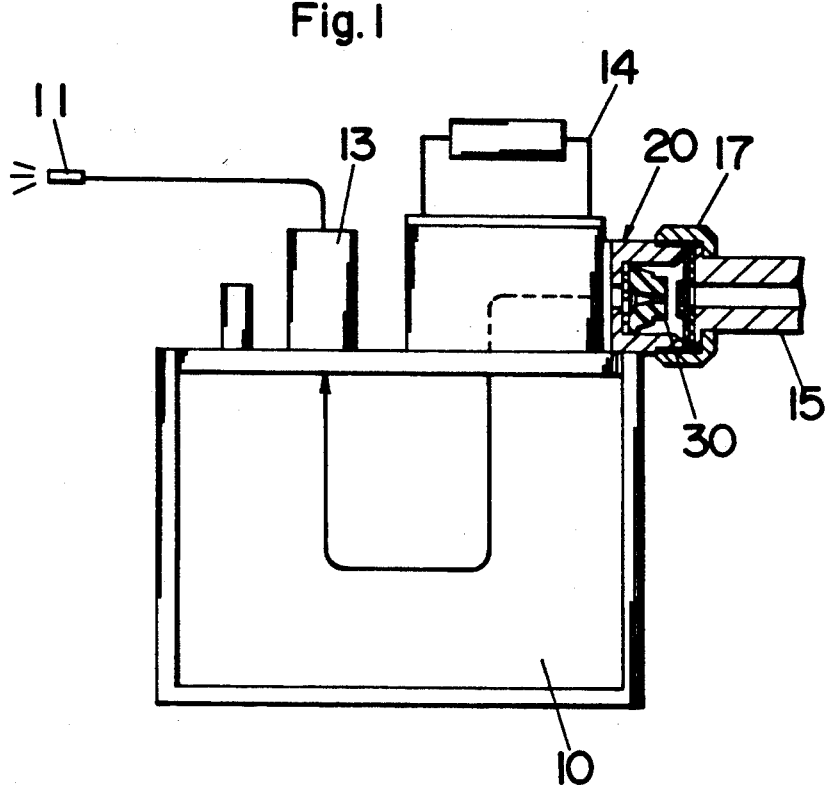
FIG. 1 is a schematic view of a washing apparatus incorporating a flow control device of the present invention to eject a rush of water for washing posterior parts or genitals.

FIG. 1 illustrates a washing apparatus equipped with a flow control device in accordance with the present invention. The apparatus is adapted in use to be incorporated in a toilet or bidet to eject a rush of water for washing posterior parts or genitals. The apparatus comprises a tank 10 containing a volume of water which is fed by way of the flow control device 20 from a water supply pipe 15 and is heated by a heater (not shown) in the tank 10. A nozzle 11 is connected to a water exit port 13 at the upper end of the tank 10 for ejecting the rush of hot water under the operation of the flow control device 20 and a solenoid operated valve 14 disposed between the device 20 and the tank 10. The solenoid operated valve 14 is electrically actuated upon manipulation of a switch handle (not shown) by the user to feed a constant volume of water through the flow control device 20 from the water supply pipe 15 into the tank 10 and in turn eject the constant volume of hot water through the nozzle 11.

Figure 2:
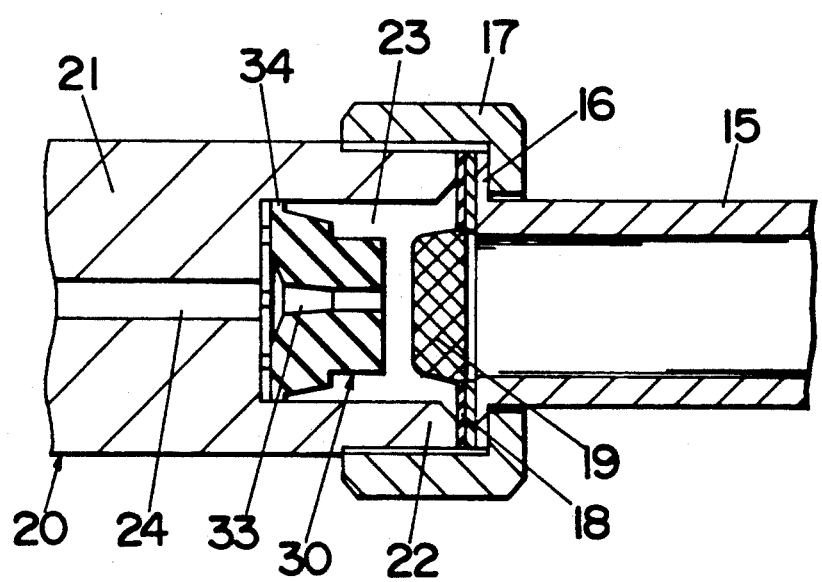
FIG. 2 is a sectional view of the flow control device in accordance with a first embodiment of the present invention.
Figure 3:
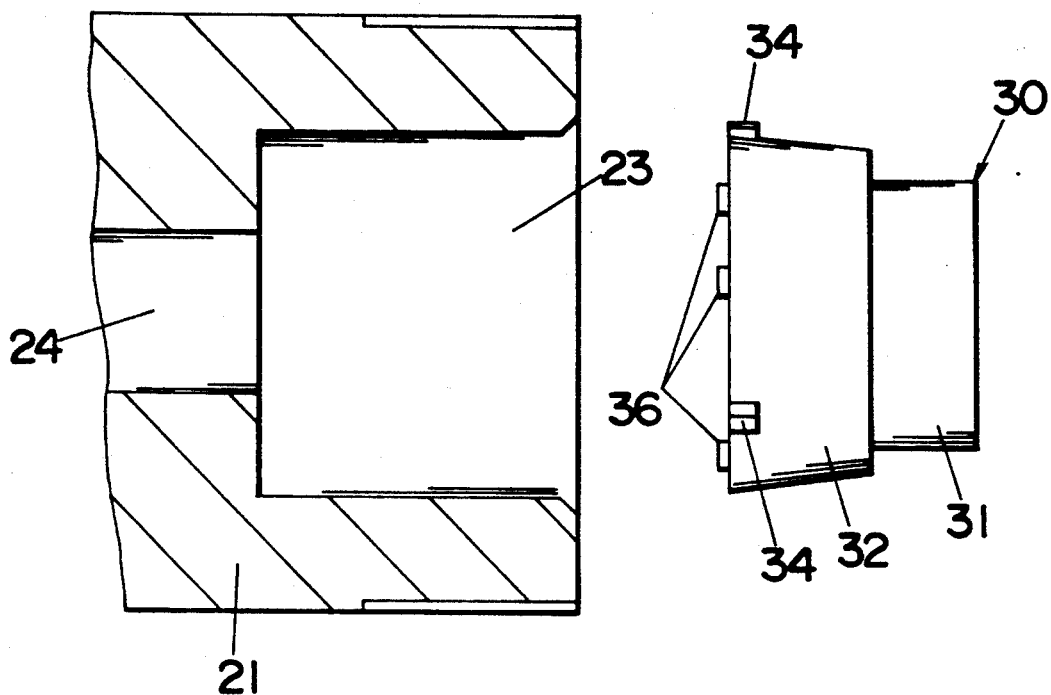
FIG. 3 is an exploded view of a conduit body and an elastic valve constituting the above flow control device.
Figure 4:
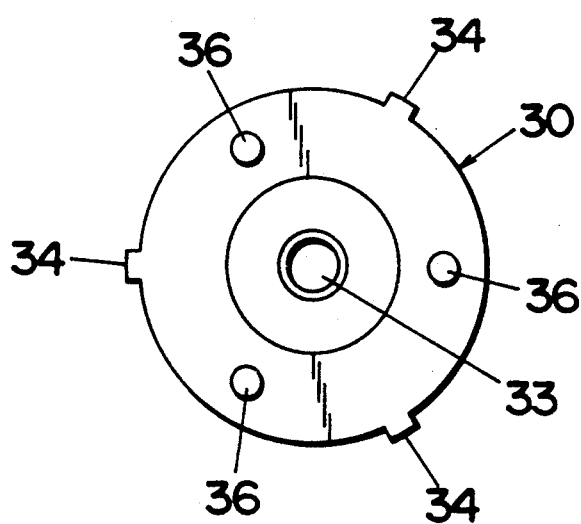
FIG. 4 is a front end view of the elastic valve.
Figure 5:
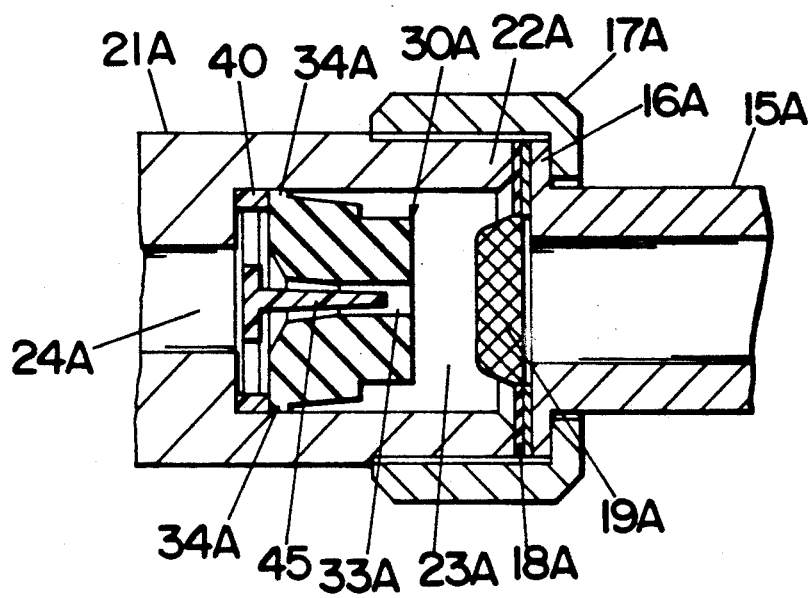
FIG. 5 is a sectional view of a flow control device in accordance with a second embodiment of the present invention.
Figure 6:
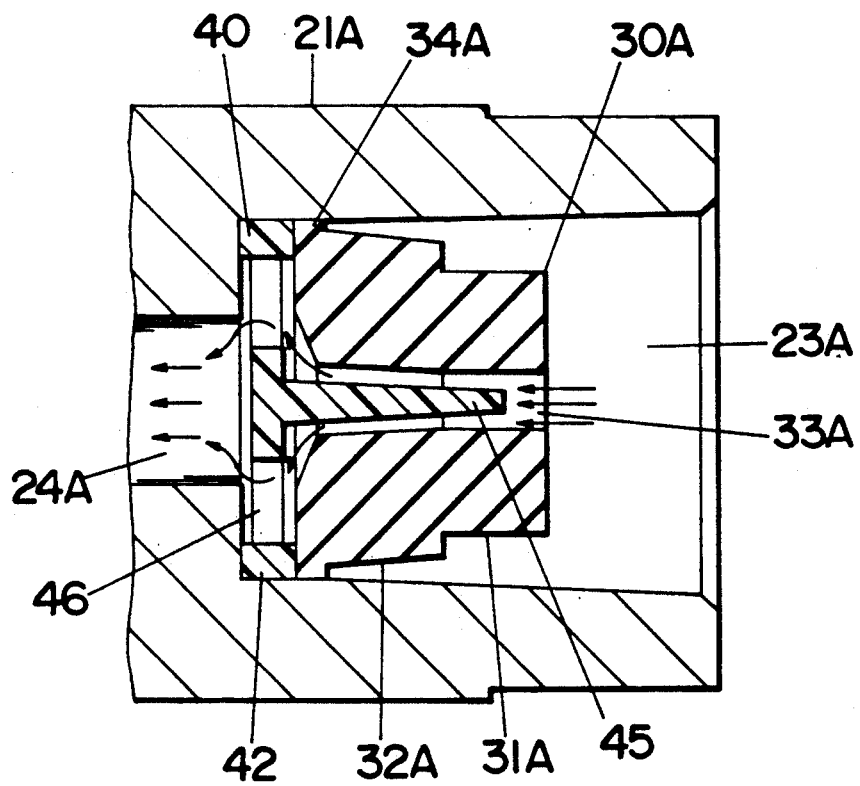
FIG. 6 is an enlarged sectional view of the above flow control device.

As shown in FIG. 2, the flow control device 20 includes a conduit body 21 having a coupling end 22 to the water supply pipe 15 and a passage 24 extending from the coupling end 22 to a discharge end (not shown) leading into the tank 10 through the valve 14. The coupling end 22 has its exterior surface threaded for engagement with a lock nut 17 so as to clamp an outer flange 16 of the water supply pipe 15 between an inward shoulder of the nut 17 and the end face of the conduit body 21. Also a washer 18 and a strainer 19 are held together with the flange 16 between the nut 17 and the conduit body 21. The coupling end 22 is formed with a concavity 23 of circular cross section defined by a bottom wall recessed from the end face of the conduit body 21 and a peripheral inner wall. The passage 24 is opened at the center of the bottom wall into the concavity 23. Received within the concavity 23 is an elastic valve 30 molded from a rubber or the like elastic material to have a small diameter section 31 and a large diameter section 32 with tapered periphery, as shown in FIG. 3. An aperture 33 is formed to extend through an axial center of the valve 30 for fluid communication between the water supply pipe 15 and the passage 24 in the conduit body 20. The aperture 33 is tapered toward the rear end of the valve 30 and is countersunk at its forward end. As shown in FIGS. 3 and 4, three circumferentially spaced projections 34 are integrally formed evenly around the front end of the large diameter section 32. The projections 34 are brought into pressed contact with the peripheral inner wall of the concavity 23 for holding the valve 30 in position within the concavity 23, as shown in FIG. 2. Thus formed valve 30 is subjected to pressure of the water supplied into the concavity 23 from the water supply pipe 15 and is capable of elastically deforming so as to vary the diameter of the aperture 33 in proportion to the pressure applied thereto, thereby allowing the water to flow through the aperture 33 at a controlled rate of keeping the flow volume at a constant level irrespective of possible variation in the pressure of the water being supplied, and therefore feeding the rush of water at a constant flow volume level from the nozzle 11. The valve 30 is also formed with circumferentially spaced studs 36 projecting integrally on the front end face for abutting against the bottom wall of the concavity 23 to provide a slight clearance between the valve 30 and the bottom wall. The clearance is of such a dimensions as not to substantially flow the water therethrough. Alternately, a single stud in the form of an annular ring is provided to surround the opening of the aperture 33 so as to prevent the water from flowing past the periphery of the valve 30 into the passage 24. With the provision of the stud 36, the front end face of the valve 30 can be spaced to reduce a frictional force acting on the valve 30, whereby the valve 30 can deform relatively freely from the bottom wall of the concavity 23 in exact accordance with the surrounding pressure to have improved flow control capability. For replacement of the valve 30, it is simply required to unfasten the look nut 17 to detach the water supply pipe 15 and to pull the valve 30 out of the concavity 23. It is noted in this regard that since the valve 30 is held in position with the circumferentially spaced projections 34 in pressed contact with the peripheral inner wall of the concavity 23, the valve 30 can be easily detached by partially deforming the valve 30 to disengage one or more of the projections 34 from the peripheral inner wall.

Referring to FIGS. 5 to 12, there is shown a flow control device in accordance with a second embodiment of the present invention which is basically identical to the above first embodiment except that a restrictor 40 is utilized in combination with the like valve 30A. Therefore, like parts are designated by like numerals with a suffix letter of "A". The valve 30A is identical to that of the first embodiment but having a flush front end face without the stud. The restrictor 40 is made of plastic or metal to have a rectifier plate 41 and a needle 45 integrally projecting from the center of the rectifier plate 41. The rectifier plate 41 is disposed between the elastic valve 30A and the bottom wall of the concavity 23A with the needle 45 projecting loosely into the aperture 33A of the valve 30A so as to define a constricted annular channel about the needle 45 within the aperture 33A. Thus, it is readily possible to have a small valve opening or the flow cross section within the aperture 33A of relatively large diameter in order to greatly reduce the flow rate and therefore obtain a constant water flow through the valve 30A even from considerably high water pressure upstream of the valve 30A. Since the aperture 33A is allowed to have a relatively large diameter, it can be accurately dimensioned at the time of molding the valve 33A so as to give a desired constricted valve opening in corporation with the needle 45, in addition to that the aperture 33A is allowed to vary its diameter over a wide range in correspondence to the water pressure applied to the valve 30A so as to compensate for a wide range of pressure variation in the water being supplied from the water supply pipe 15A. The needle 45 is tapered toward its free end in conformity with the like tapered aperture 23A.

As shown in FIGS. 6, and 10 to 12, the rectifier plate 41 comprises a ring 42 fitted around the peripheral inner wall of the concavity 23A between the valve 30A and the bottom wall of the concavity 23A and a center hub 43 from which the needle 45 integrally projects. The ring 42 and the hub 43 are integrally connected by a plurality of radial segments 45. The radial segments 45 and the hub 43 are dimensioned to have a thickness less than the ring 42 such that clearances are formed on the opposite sides thereof and the valve 30A respectively with the valve 30A and the bottom wall of the concavity 23A. These clearances are cooperative with slots 46 defined between the adjacent radial segments 44 to define a vent which is responsible for rectifying the water flow rushing out through the aperture 33A of the valve, as indicated by arrows in FIG. 6, and therefore eliminating undesirable cavitation which might occur when the valve 30A restricts the water flow considerably in response to high water pressure from the water supply pipe 15A. Also in this embodiment, the valve 30A is held in place by pressing the circumferentially spaced projections 34A against the peripheral inner wall of the concavity, the valve 30A can be readily removed in the like manner as in the first embodiment for the replacement purpose.

What is claimed is:

1. A flow control device comprising:
   a conduit body with a coupling end for coupling with a water supply pipe to receive water therefrom and a discharge end for discharging the water therethrough, said conduit body formed in said coupling end with a concavity having a bottom wall recessed from an end face of said coupling end and a peripheral inner wall, said conduit body having a passage opened in said bottom wall and extending therethrough to said discharge end;
   an elastic valve received in said concavity, said valve having an aperture in fluid communication between said water supply pipe and said passage for feeding water from said water supply pipe into said passage through said aperture, said valve capable of elastically deforming to vary a diameter of said aperture in proportion to the pressure of the water applied thereto in order to feed the water through said passage at a constant flow volume level regardless of the pressure in said water supply pipe, said valve formed on its outer peripheral surface with three or more projections spaced circumferentially about said aperture in pressed contact relation with said inner peripheral wall of said concavity for holding said valve in position within said concavity;
   said flow control device further including a restrictor with a rectifier plate and a flow regulating needle projecting from the center of said rectifier plate, said rectifier plate disposed between said valve and the bottom wall of said concavity with said flow regulating needle projecting loosely into said aperture in such a manner as to define a constricted annular channel within said aperture about said flow regulating needle, said rectifier plate formed with a vent for fluid communication between said annular channel and said passage in said conduit body.

2. A flow control device as set forth in claim 1, wherein said rectifier plate comprising a ring fitted inside of said peripheral inner wall between said bottom wall and said valve and a center hub from which said flow regulating needle projects integrally, said center hub integrally connected to said ring by a plurality of radial segments, said center hub and said radial segments are of thickness less than said ring to define clearances on the opposite side thereof with a corresponding end face of said valve and with said bottom wall, respectively, and said clearances cooperative with a plurality of slots formed between the adjacent radial segments to define said vent for fluid intercommunication between the annular channel of said valve and the passage of said conduit body.

3. A flow control device as set forth in claim 1, wherein said aperture is tapered to have an inside diameter smaller toward an upstream end than at a downstream end of said valve and wherein said flow regulating needle is tapered toward its free end.

* * * * *